United States Patent
Ravi

(10) Patent No.: US 7,810,155 B1
(45) Date of Patent: Oct. 5, 2010

(54) PERFORMANCE ENHANCEMENT FOR SIGNATURE BASED PATTERN MATCHING

(75) Inventor: Sunil Ravi, Milpitas, CA (US)

(73) Assignee: Symantec Corporation, Mountain View, CA (US)

( * ) Notice: Subject to any disclaimer, the term of this patent is extended or adjusted under 35 U.S.C. 154(b) by 1279 days.

(21) Appl. No.: 11/096,248

(22) Filed: Mar. 30, 2005

(51) Int. Cl.
*G08B 23/00* (2006.01)

(52) U.S. Cl. .......................... 726/22; 726/26

(58) Field of Classification Search ............ 726/22, 726/23, 24, 25, 26; 709/224; 380/201, 202, 380/203
See application file for complete search history.

(56) References Cited

U.S. PATENT DOCUMENTS

| | | | |
|---|---|---|---|
| 3,568,156 A * | 3/1971 | Thompson | 707/6 |
| 6,487,666 B1 * | 11/2002 | Shanklin et al. | 726/23 |
| 7,260,558 B1 * | 8/2007 | Cheng et al. | 706/12 |
| 2003/0033531 A1 * | 2/2003 | Hanner | 713/176 |
| 2003/0229710 A1 * | 12/2003 | Lie et al. | 709/231 |
| 2004/0199931 A1 * | 10/2004 | Kumar et al. | 725/19 |
| 2005/0273450 A1 * | 12/2005 | McMillen et al. | 707/1 |

* cited by examiner

*Primary Examiner*—Eleni A Shiferaw
(74) *Attorney, Agent, or Firm*—Hunton & Williams, LLP

(57) ABSTRACT

Performance enhancement for signature based pattern matching may include one or more signature preprocessing steps. The signatures in the signature set may be preprocessed prior to performing pattern matching, including by breaking each signature broken down into one or more components. For at least one of the one or more components, boundary values as well as possible offsets of the boundary values may be identified and matched against a data stream to determine whether the data stream does not match a particular signature, thereby allowing a quick narrowing of the set of signatures to be applied fully to the data stream.

25 Claims, 6 Drawing Sheets

PERFORMANCE ENHANCEMENT FOR SIGNATURE BASED PATTERN MATCHING

BACKGROUND OF THE INVENTION

Intrusion detection systems employ pattern matching techniques on network data in order to identify strings of data that are found in exploits that are known to have been used to inflict damage on target networks and systems. Specifically, pattern matching is used by intrusion detection systems to match network data to a set of signatures that represent all currently known attacks at a given time. Since the amount of network data that requires scanning and the set of signatures that represent attacks are both typically large, it is usually impossible to scan network data for all signatures in real time. In addition, applying all signatures in the current set, many of which may require numerous compare operations only to find in the end the data stream does not match the signature, results in a number of unnecessary operations. Further inefficiency results where recursion is present within one or more of the signatures, as the same signature (or component thereof) may need to be applied multiple times. Consequently, most intrusion detection systems categorize the set of signatures to be matched into subsets having common criteria so that the number of signatures that are applied to a given input data stream is minimized.

One approach used to filter out signatures that do not apply to the current input data stream is prefix based filtering. With this technique, the first few bytes of all signatures are identified, and the signatures that have a common prefix are grouped together. Only those signatures included in a subset with a common prefix that matches the corresponding initial bytes of the target data stream are applied to the target data stream, thus saving resources on unnecessarily processing other signatures that do not have the given prefix. However, while prefix based filtering narrows the number of signatures to be applied somewhat, it fails at preventing unnecessary compare operations and/or iterations of signature matching for signatures that are applied to a given data stream. In addition, prefix based filtering does not prevent the inefficiency that can result from attempting to apply a signature before all the data required to fully apply the signature has been received.

Thus, there is a need to enhance the performance of signature based pattern matching by significantly reducing unnecessary iterations of full signature matching.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Performance enhancement for signature based pattern matching is disclosed. In one embodiment, the signatures in the signature set are preprocessed prior to performing pattern matching. Specifically, each signature is broken down into components. For each component, boundary values as well as possible offsets of the boundary values are identified and matched against any given data stream to determine whether the data stream does not match a particular signature, thereby allowing a quick narrowing of the set of signatures to be applied fully to the data stream. In some embodiments, specific segments and offsets in the target data stream are identified that specify the locations within the data stream at which particular signatures may potentially match. Thus, if a particular signature is identified as a potential match with the data stream or a portion of the data stream, the additional information pertaining to the segments and offsets in the data stream where boundary value matches were found during preprocessing is used to quickly and efficiently apply the full signature to the given data stream.

Figure 1:
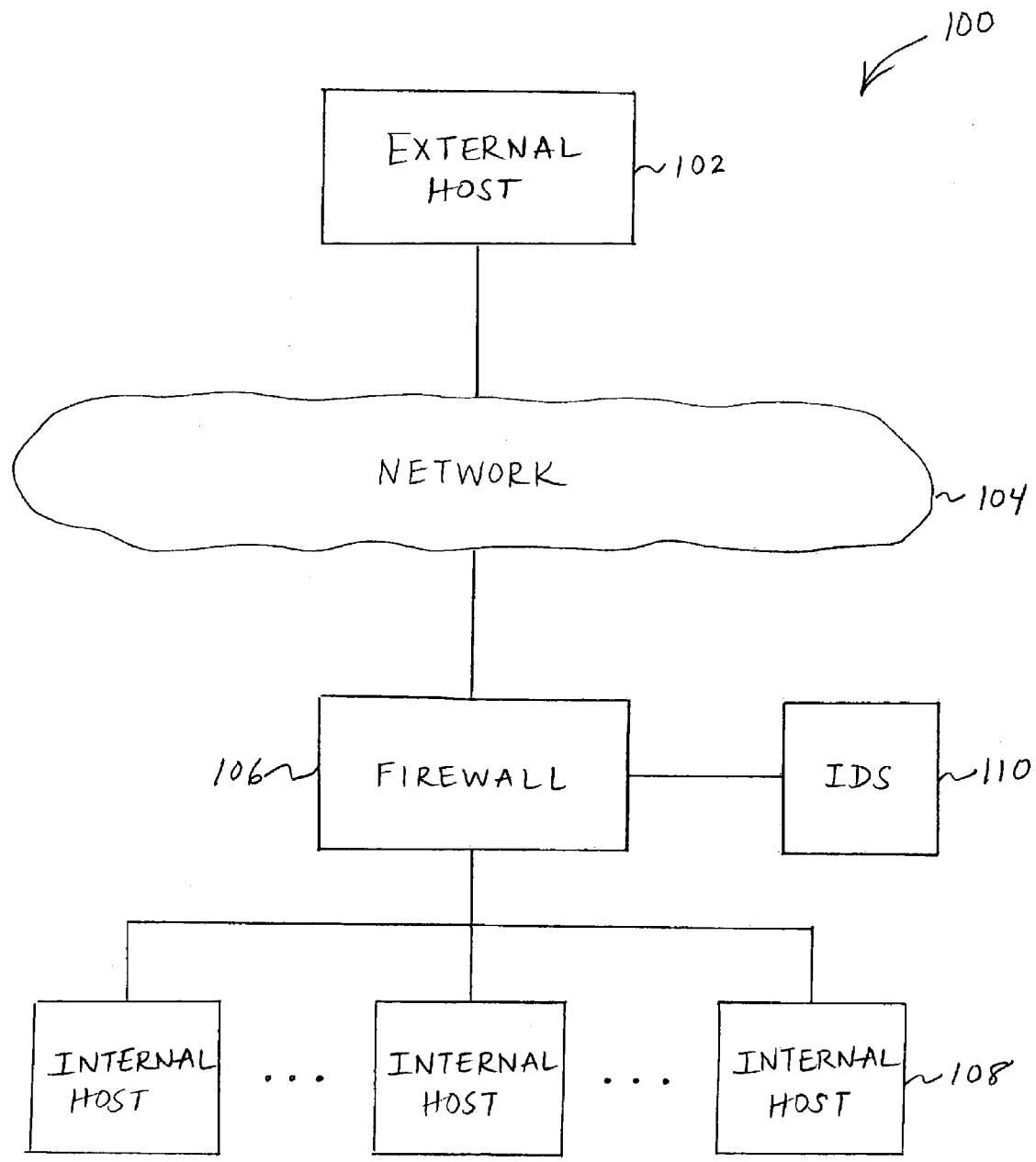
FIG. 1 illustrates an embodiment of a network environment in which an intrusion detection system (IDS) contributes to securing an internal network from external threats.

FIG. 1 illustrates an embodiment of a network environment in which an intrusion detection system (IDS) contributes to securing an internal network from external threats. In the example shown, network environment 100 includes an external host 102 connected via an external network 104 to a secured network including a plurality of internal hosts such as internal host 108. The boundary of the secured internal network is defined by a firewall 106. In the example shown, data transferred between external and internal hosts in network environment 100 is monitored by an intrusion detection system (IDS) 110. In some embodiments, pattern matching is used by IDS 110 to detect security threats in data transmitted by external host 102 to internal hosts such as internal host 108.

Signature based pattern matching techniques may be employed by an IDS on network data in order to identify data that are found in attacks that may inflict damage to networks and/or systems. An up to date set of signatures that represents all currently known threats or attacks is maintained by the IDS so that the set of signatures can be matched against network data to detect compromised and/or malicious data. Signatures may also be used, without limitation, to monitor the use of resources, enforce policies, etc., for example by determining that forbidden content is being downloaded or used in communications, or that confidential or otherwise sensitive information is being sent outside a trusted zone. Signatures typically include combinations of bytes (i.e. characters or literals) and operators that are used to define and search for strings and/or patterns of strings associated with known attacks. In some embodiments, a signature is a regular expression. Network data is acquired from various sources, such as from real time or recorded network traffic, files, etc. In addition, network data is gathered in multiple segments. For example, when processing network traffic, the input data arrives in various packets and while processing a file, the input data arrives in various buffers. In some embodiments, signature based pattern matching is iterated over several times by the IDS, as and when data becomes available. However, factors such as the volume of data that needs scanning, the number of attacks for which signatures exist, the rate at which new attacks are invented, etc., make pattern matching complicated and have the potential to degrade the performance of an IDS.

Signature based pattern matching can impose an enormous performance penalty on an IDS if each data stream is matched against each signature in the signature set since the signature set and the amount of data that needs to be scanned is typically large, rendering real-time detection by such a method virtually impossible. If a particular signature is comprised of any operators that allow recursion, several iterations for only that particular signature may be necessary, further increasing the amount of time necessary to match the signature against a given data stream. In order to improve performance, an IDS or other analysis system or process may employ prefix based filtering in which the signature set is grouped into subsets of signatures with common prefixes.

For example, if the prefix "abc" is found in the current input data stream, a signature such as "foo.*bar" results in a no-match since the prefix of the data stream "abc" does not match the prefix "foo" of this particular signature. Thus, if prefix based filtering is employed, only signatures with the same prefix as the current input data stream will be applied fully to the given data stream. However, prefix based filtering fails to prevent unnecessary comparison operations and/or iterations of matching for some signatures. For instance, even if prefix based filtering is used to narrow the set of signatures to be applied, a signature such as "foo.*bar" would be iterated over multiple times (i.e., multiple string or character comparison operations) even if the input data stream looked like "fooxyz . . . " or "fooxyzxyzbax," both of which would result in a no-match and might easily have been eliminated by pre-processing that looked beyond the prefix. The wildcard operator, ".*", signifies that any number of characters may appear between prefix "foo" and suffix "bar". Thus, after identification of the prefix "foo", prefix based filtering iterates repeatedly for the given example, with analysis typically continuing until the end of the relevant data set is reached with no match being found. Even for a signature without any operators (i.e. a signature comprised only of bytes or literals), prefixed based filtering may perform one or more unnecessary compare operations, for example, if it proceeds to fully match a signature that eventually results in a no-match and/or if enough data is not present initially to conclude whether or not there is a match. Furthermore, prefix based filtering fails to filter out signatures whose prefixes include operators.

In prefixed based filtering in typical systems, after identification of a common prefix in a given input data stream, the subset of signatures with the same prefix are matched on a byte per byte basis with the data stream until a match or no-match can be concluded. In addition, one or more signatures that begin with an operator may be applied to the given data stream since prefix based filtering does not filter out signatures that begin with operators.

Narrowing the set of signatures to be applied fully to a data stream using criteria other than and/or in addition to prefix based filtering is disclosed. In some embodiments, a number of additional signatures can be filtered out and/or unnecessary comparison operations and/or iterations inherent in prefix based filtering prevented by using other filtering criteria instead of and/or in addition to prefix based filtering to identify which signatures should be applied fully to a particular data stream. Such identifying criteria for each signature may be used to quickly check or screen an input data stream for a potential match. If the quick check for a particular signature indicates the data stream could possibly match the complete signature, the entire signature is applied to the given input data stream. Otherwise, the signature is not applied.

In some embodiments, each signature is parsed to identify boundary values and locations that must be present in order for a data stream to potentially match the signature. If the boundary values are not present in any of the locations (or combinations of location) in which one would expect to find them in a data stream that matches the full signature, the full signatures is not applied. If so, the full signature is applied to determine whether the portions of the target data stream that lie within the matching boundary values satisfy the corresponding parts of the signature.

By performing quick checks, some signatures that are not filtered out with prefix based filtering may be filtered out efficiently. Also, signatures that begin with operators may be filtered out if appropriate. For some signatures, a significant number of comparison operations and/or signature matching iterations (e.g., recursion) may be prevented.

In some embodiments, during the quick check, the location (s) in the target data stream at which matches to boundary or other quick check values are found are stored. Such information may be subsequently used to quickly process the full signature over the data stream, e.g., by looking only between the previously-matched boundary values in the target data stream to determine if the corresponding remaining parts of the signature are satisfied, thereby further optimizing the overall performance of signature based pattern matching.

Figure 2:
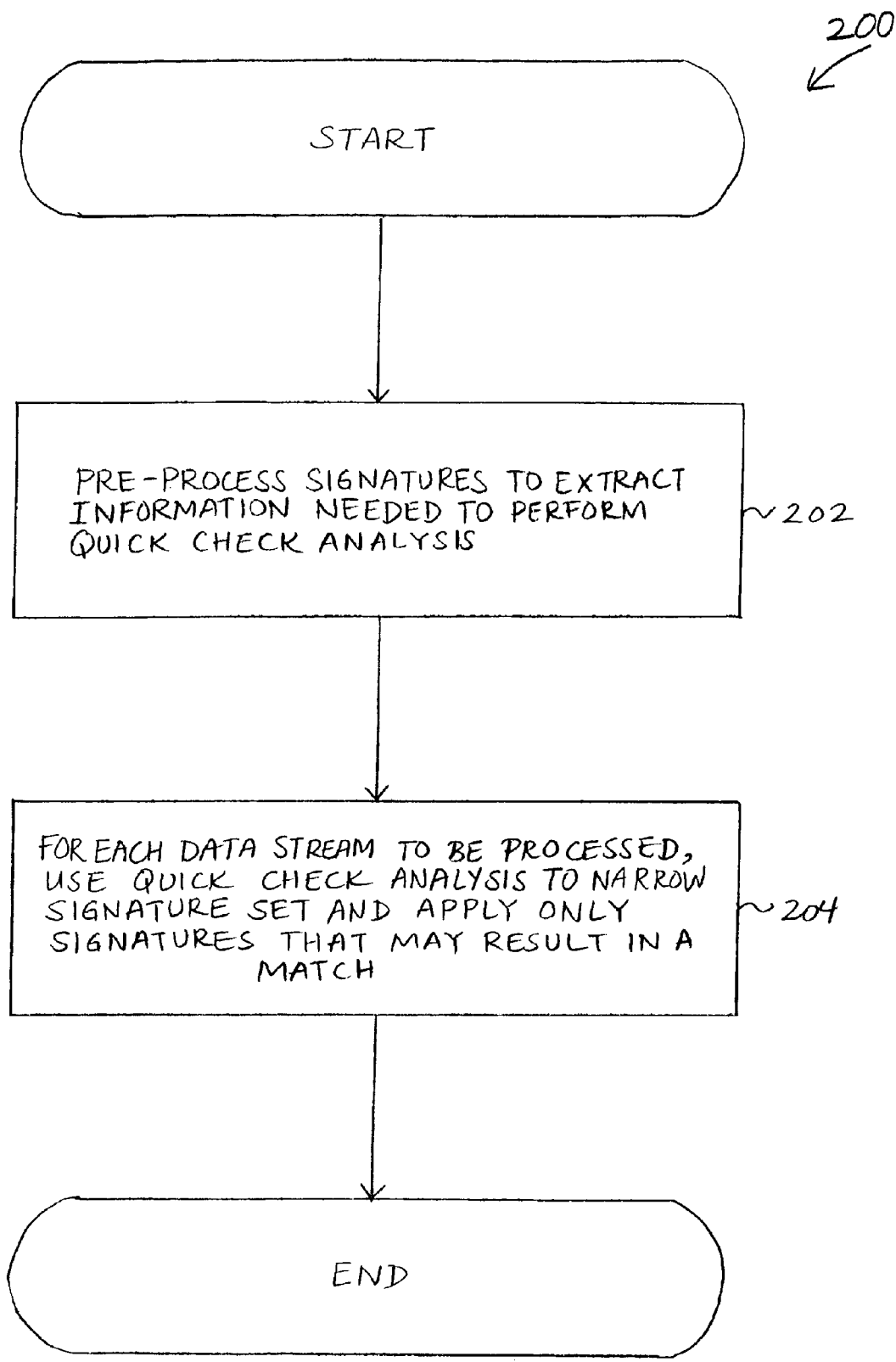
FIG. 2 illustrates an embodiment of a process used for signature based pattern matching.

FIG. 2 illustrates an embodiment of a process 200 used for signature based pattern matching. At 202 the set of signatures are preprocessed to extract information needed to perform a quick check analysis for each signature. At 204, for each data stream to be processed, the quick check analysis is used to narrow the signature set and apply to the data stream only signatures for which the quick check analysis indicates a potential match. In some embodiments, during the quick check in 204 location and offset information from the data stream is collected and recorded for signatures that result in a potential match so that such information can be employed when the full signatures are applied to the data stream.

Figure 3:
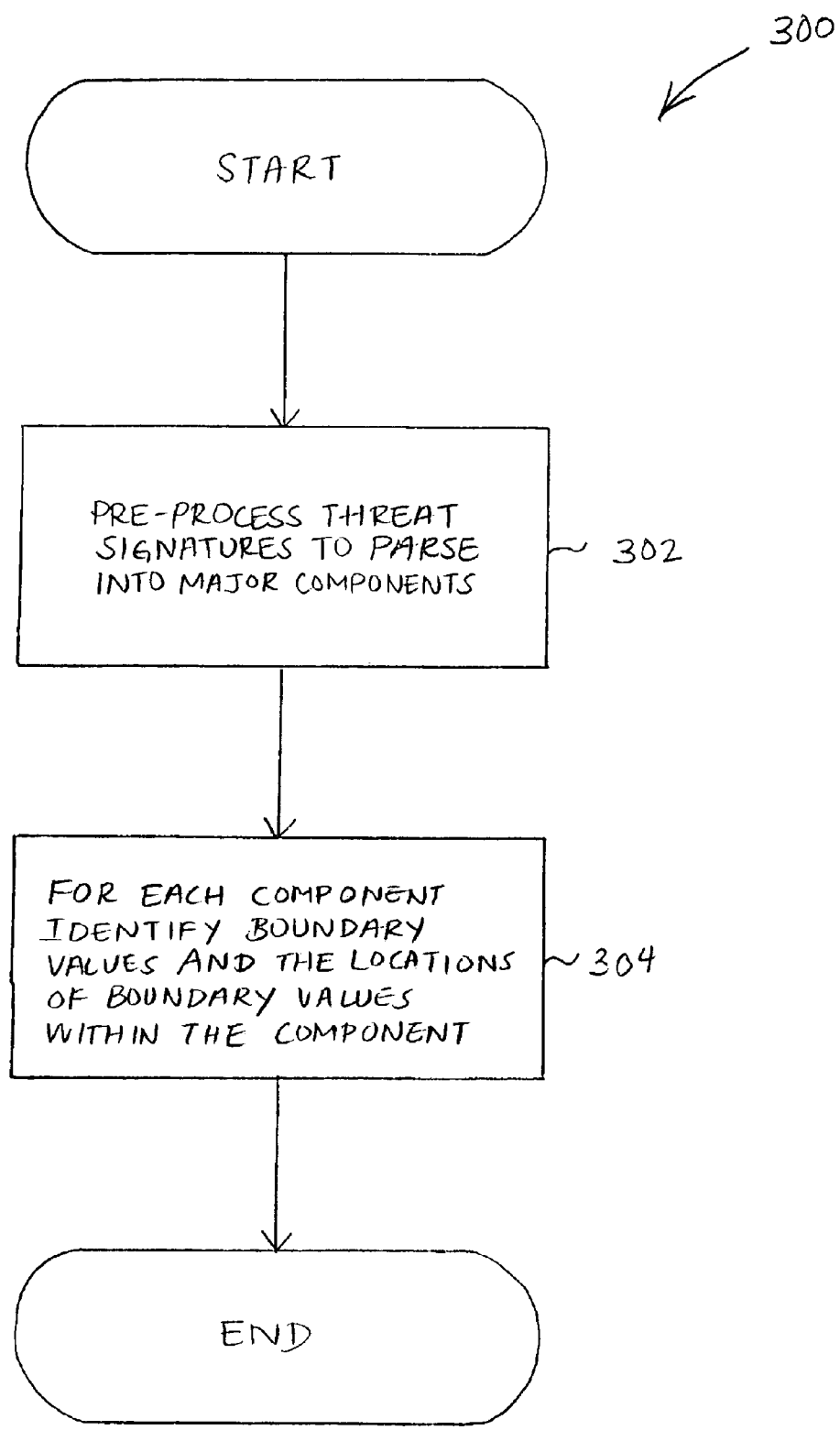
FIG. 3 illustrates an embodiment of a process used to preprocess signatures in the signature set to extract information needed to perform a quick check analysis for each signature.

FIG. 3 illustrates an embodiment of a process used to preprocess signatures in the signature set to extract information needed to perform a quick check analysis for each signature. In some embodiments, process 300 of FIG. 3 is used to implement 202 of FIG. 2. In the example shown, at 302 a signature is parsed into its major components. For the case of a component that is a simple character sequence (i.e. it does not include any operators, recursion indicators, grouping characters, etc.), the component starts with a simple character, and the end of the component occurs when anything other than a simple character (e.g. a character on which an operator and/or recursion indicator is applied, an operator, a grouping character, etc.) is encountered in the signature. In some embodiments, a component includes only one character and any operator(s) and/or a recursion indicator applied to that character. Also, a component may only include one or more operators. In some embodiments, the start of a new component in a signature is identified by searching for a grouping character, such as an opening parenthesis, associated with the beginning of a sub-expression or other subpart of the signature. For a component that begins with an opening parenthesis (or other grouping character), the component includes in some embodiments all characters enclosed by the opening parenthesis and the closing parenthesis that matches the opening parenthesis that marked the beginning of the component and may include one or more operator(s), a recursion indicator, etc., that corresponds to the portion of the component enclosed by the aforementioned opening and closing parentheses.

If a component is recursive, in some embodiments, a recursion indicator follows the closing parenthesis that matches the opening parenthesis that designates a new component in the signature. A recursion indicator may also be applied to a component that is a single character and is not enclosed by parenthesis. A recursion indicator quantifies the recursion by a single number or multiple numbers that define a range, e.g., indicating the number of times the foregoing sub-expression or character may and/or must occur for a match to be found. The recursion indicators of the signature are considered a part of the component to which they correspond.

The portion of a component enclosed by the opening parenthesis that designates a new component and the corresponding closing parenthesis is referred to as a subcomponent in the discussion herein if one or more operator(s) and/or a recursion indicator is applied to the portion enclosed by the aforementioned opening and closing parenthesis (i.e. the subcomponent). A subcomponent may include operator(s) and/or recursion as well. Alternatively, a subcomponent may be a single character on which one or more operators and/or a recursion indicator is applied. In some embodiments, a component has at most one subcomponent. For some components, such as a simple character sequence, the component does not have a subcomponent.

As an example of the manner in which a signature is broken down into components and subcomponents at 302 of FIG. 3 in some embodiments, consider the following signature: "foobar((xyz){2,4}bar){3,6}abcd(jkl){1,3}bar". In some embodiments, this signature would be parsed into five components. The first component is the simple character sequence "foobar". The second component, "((xyz){2,4}bar){3,6}", is more complex, beginning with an opening parenthesis and ending with the recursion indicator "{3,6}" after the closing parenthesis that matches the opening parenthesis. The portion "(xyz){2,4}bar" is the subcomponent of component "((xyz){2,4}bar){3,6}". In this example, subcomponent "(xyz){2,4}bar" is repeated three to six times as defined by the range of the recursion indicator "{3,6}". In addition, a portion of the subcomponent, "xyz", is repeated two to four times as defined by the recursion indicator "{2,4}" within the subcomponent. Specifically, possible permutations of the subcomponent in this example include: "xyzxyzbar", "xyzxyzxyzbar", and "xyzxyzxyzxyzbar". Each of the aforementioned permutations of the subcomponent may be repeated three to six times to form a possible second component of the given signature. The third component in the signature is the simple character sequence "abcd". The fourth component "(jkl){1,3}" also involves recursion. Specifically, the subcomponent "jkl" of component "(jkl){1,3}" is repeated one to three times. Possible permutations of the fourth component, therefore, include "jkl", "jkl jkl", and "jkl jkl jkl". Finally, the last component of this signature is the simple character sequence "bar".

In one embodiment, the signature "foobar+" is considered to comprise the two components "fooba" and "r+". The end of the first component, a simple character sequence, "fooba", occurs when anything other than a simple character is encountered in the signature. In this example, the "r" is not a simple character because an operator "+" is applied to it. The component "r+" includes only a single character and its associated operator. The subcomponent of component "r+" is "r" while component "fooba" does not have a subcomponent. Similarly, consider the signature "foobar{5,10}". This signature is comprised of the two components "fooba" and "r{5,10}". The end of the first component, a simple character sequence, "fooba", occurs when anything other than a simple character is encountered in the signature. In this example, the "r" is not a simple character because a recursion indicator "{5,10}" is applied to it. The component "r{5,10}" includes only a single character and its associated recursion indicator. The subcomponent of component "r{5,10}" is "r" while component "fooba" does not have a subcomponent. In addition, consider the signature "foobar.*xyz". This signature is comprised of the three components "foobar", ".*", and "xyz". In this example, the operator ".*" is not applied to any character or set of characters and thus designates a new component of the signature. None of the three components of this signature have a subcomponent. Finally, consider the signature "foobar((abc){2,4}|(XYZ){10,15})". This signature is comprised of the two components "foobar" and "((abc){2,4}|(XYZ){10,15})". The second component "((abc){2,4}|(XYZ){10,15})" of this signature (as well as the first component) does not have a subcomponent since no operator(s) and/or recursion indicator(s) are applied to the portion of the component enclosed within the opening and closing parenthesis that define the component.

As demonstrated with respect to the various examples given above, in some embodiments a signature may be broken down into components, with the start of a new component designated by a character, an operator, or a grouping character (e.g. an opening parenthesis). For a component that starts with a character and is a simple character sequence (i.e. the component does not include any operators, recursion indicators, grouping characters, etc.), the end of the component occurs when anything other than a simple character (i.e. a character on which operator(s) and/or a recursion indicator is applied, an operator, a grouping character, etc.) is encountered. For a component that starts with a character but operator(s) and/or a recursion indicator are applied to the character, the component is a single character and includes the associated operator(s) and/or recursion indicators. For a component that starts with an operator that is not applied to any character or set of characters, the end of the component occurs when anything other than an operator is encountered. For a component that begins with an opening grouping character, such as an opening parenthesis, the end of the component occurs when the corresponding closing grouping character is encountered, such as the closing parenthesis that corresponds to the aforementioned opening parenthesis. If any operator(s) and/or recursion indicators follow the closing grouping character that corresponds to the opening grouping character, the operator(s) and/or recursion indicators are considered part of the component.

In some embodiments, the first and last values (e.g., the simple character values, bytes) for each subcomponent or component, along with any applicable operator(s) and/or recursion indicators, are used to identify boundary values and locations (i.e. offsets) that must be satisfied for a target data stream to be a potential match for the associated signature. As described more fully below, these boundary values and locations are used as a sort of template or rough fingerprint to eliminate quickly from consideration any signatures for which the associated boundary values are not present, thereby saving all the processing that would be required to apply the signature fully. While certain specific approaches to parsing a signature into components are described in detail herein, any approach that enables a quick check to be performed by comparing one or more boundary values associated with one or more signature components to determine relatively quickly and with a relatively small number of compare operations (e.g., relative to applying the full signature) whether or not a data stream matches a rough outline of the signature may be used.

Referring further to FIG. 3, at 304, for each component, the boundary values and the locations of boundary values within each component are identified. The values of the first character and the last character of a component comprise the boundary values of a component. The locations of boundary values within a component can be determined by identifying the values of the possible offsets of the last character of the component from the first character. In some embodiments, the offsets of the last character from the first character can be computed by the minimum and maximum lengths of a subcomponent within a component and the minimum and maximum lengths of the component, as indicated by the length of any component string(s), any specified recursion or range of recursion, and/or any operator(s) applied to the component. Thus, in some embodiments, at 304 the first character, last character, minimum subcomponent length, maximum subcomponent length, minimum component length, and maximum component length are identified for each component. If a component does not have a subcomponent, the minimum and maximum subcomponent and component lengths are defined to be the same. Alternatively, for some components, such as ".*", boundary values and the locations of possible boundary values can not be identified.

As an example of the manner in which information is extracted from components at 304 of FIG. 3, consider the aforementioned signature example: "foobar((xyz){2,4}bar){3,6}abcd(jkl){1,3}bar". For the first component of this signature, "foobar", the first character is "f", the last character is "r", the minimum length of the subcomponent is 6, the maximum length of the subcomponent is 6, the minimum length of the component is 6, and the maximum length of the component is 6. For the second component of the signature, "((xyz){2,4}bar){3,6}", the first character is "x", the last character is "r", the minimum length of the subcomponent is 9 (i.e. (length of "xyz"*2)+length of "bar"), the maximum length of the subcomponent is 15 (i.e. (length of "xyz"*4)+length of "bar"), the minimum length of the component is 27 (i.e. minimum length of the subcomponent*3), and the maximum length of the component is 90 (i.e. maximum length of the subcomponent*6). For the third component, "abcd", the first character is "a", the last character is "d", the minimum length of the subcomponent is 4, the maximum length of the subcomponent is 4, the minimum length of the component is 4, and the maximum length of the component is 4. For the fourth component, "(jkl){1,3}", the first character is "j", the last character is "l", the minimum length of the subcomponent is 3, the maximum length of the subcomponent is 3, the minimum length of the component is 3 (i.e. minimum length of the subcomponent*1), and the maximum length of the component is 9 (i.e. maximum length of the subcomponent*3). Finally, for the fifth component, "bar", the first character is "b", the last character is "r", the minimum length of the subcomponent is 3, the maximum length of the subcomponent is 3, the minimum length of the component is 3, and the maximum length of the component is 3.

Although in some instances it may be possible to calculate all possible last character offsets of a component, doing so may be computationally inefficient. Thus, in some embodiments, multiples of the range defined by the minimum and maximum lengths of the subcomponents are used to identify possible offsets of the last character of a component wherein the multiples are determined from operators and/or recursion indicators applied to the subcomponent. For example, for the component "((xyz){2,4}bar){3,6}" of the previous example, the minimum and maximum lengths of the subcomponent "(xyz){2,4}bar" are 9 and 15, respectively. Since the subcomponent "(xyz){2,4}bar" of component "((xyz){2,4}bar){3,6}" may be repeated three to six times as indicated by the recursion indicator "{3,6}" applied to the subcomponent, multiples of the range 9-15 at multiples of the range 3-6 are identified as possible offsets of the last character of the component, "r". Thus, the set of possible last character offset values of the component includes: 9×3, 9×4, 9×5, 9×6, 10×3, 10×4, 10×5, 10×6, 11×3, 11×4, 11×5, 11×6, 12×3, 12×4, 12×5, 12×6, 13×3, 13×4, 13×5, 13×6, 14×3, 14×4, 14×5, 14×6, 15×3, 15×4, 15×5, and 15×6.

Although the last character of a subcomponent may not occur at all of the values of the range defined by the subcomponent minimum and maximum lengths (e.g. for the example given above, the last character "r" of subcomponent "(xyz){2,4}bar" may only occur at valid subcomponent lengths of 9, 12, and 15 and may not occur at subcomponent lengths of 10, 11, 13, 14 which are included in the subcomponent length range 9-15), it may be computationally difficult or even impossible to calculate all valid subcomponent lengths. In some embodiments, the exact possible length(s) of the subcomponent are used to determine all possible offsets of the last character in a component. However, in alternative embodiments, all values of the range of lengths defined by the minimum and maximum lengths of the subcomponent are treated as valid lengths of the subcomponent and locations for the last character or value of the subcomponent even if for some of them the associated last value location is not actually a valid location for the last value of the subcomponent. Multiples of valid lengths of the subcomponent at multiples defined by one or more operator(s) and/or recursion indicators applied to the subcomponent are considered possible offset values of the last character of a component. For some components, the value(s) of the calculated offset(s) of the last character is/are the exact value(s) at which the last character may occur. For example, for the component "(jkl){1,3}", the length of the subcomponent is 3, and the last character "l" must occur at offsets of 3×1, 3×2, or 3×3 from the first character "j". For the component "abcd", the last character "d" occurs from the first character "a" at an offset of 4, the length of the component.

Subcomponent minimum and maximum lengths allow scanning for the last character of a component to be more efficient by allowing bytes in the payload to be skipped instead of processing on a byte per byte basis. For example, consider again the component "((xyz){2,4}bar){3,6}". As was determined above, the minimum and maximum lengths of this component are 27 and 90, respectively. When scanning a data stream for this particular component, after finding the first character "x" in the data stream, the last character "r" may occur in a potentially matching target data stream within an offset range of 27-90 from the first character as determined from the possible minimum and maximum lengths of the component. However, comparing the last character "r" at offsets of 27-90 from the position of an "x" results in up to 64 (i.e. 90−27+1) possible comparisons. In some embodiments, as noted above, the subcomponent minimum and maximum lengths are used to identify more precisely and search only those locations in the range 27-90 in which a character "r" if found would indicate a possible match for the component. Instead of searching the entire range between the minimum and maximum component lengths, if comparisons at multiples of the range defined by the subcomponent minimum and maximum lengths are performed, the maximum number of comparisons is considerably reduced. As explained in detail above, the possible last character offsets of the given component occur at multiples of the subcomponent range 9-15 at multiples of the range 3-6, and the set of possible last character offset values includes: 9×3, 9×4, 9×5, 9×6, 10×3, 10×4, 10×5, 10×6, . . . , 15×3, 15×4, 15×5, and 15×6. Thus, utilizing multiples of the range of subcomponent lengths results in only up to 28 (i.e. (15−9+1)*(6−3+1)) maximum comparisons compared to a maximum of 64 comparisons if the entire range of component lengths is searched.

By breaking down a signature into a sequence of several components, the task of signature based pattern matching can be broken down into several sub-tasks. The boundary values and the offsets of the last character are extracted from each component of a signature to perform a quick check on each data stream. While processing an input data stream, a quick check analysis of the data stream against the set of signatures is performed first in order to prevent unnecessary comparison operations and/or iterations, thus saving time and making pattern matching more efficient. In some embodiments, the quick check analysis is used in conjunction with prefix based filtering wherein the quick check analysis is performed only on signatures associated with a prefix that matches the corresponding initial portion of the target data stream. During a quick check of a signature against the target data stream, the components of the signature are processed sequentially, with matching performed only for the first character and the last character of each component at the predetermined last character offsets for each component. If the matching of any component in the signature fails (i.e. the first character and/or the last character of a component does not match with the given data stream at valid locations), the entire signature results in a no-match, and further processing of the signature is unnecessary.

In some embodiments, during the matching of each component, the offsets of the first and last characters in the payload that matched the component are collected and recorded in the process of the quick check. This information about the locations in the payload where potential matches of components of a signature can be found is utilized to optimize the process of matching the entire signature against the payload.

Figure 4:
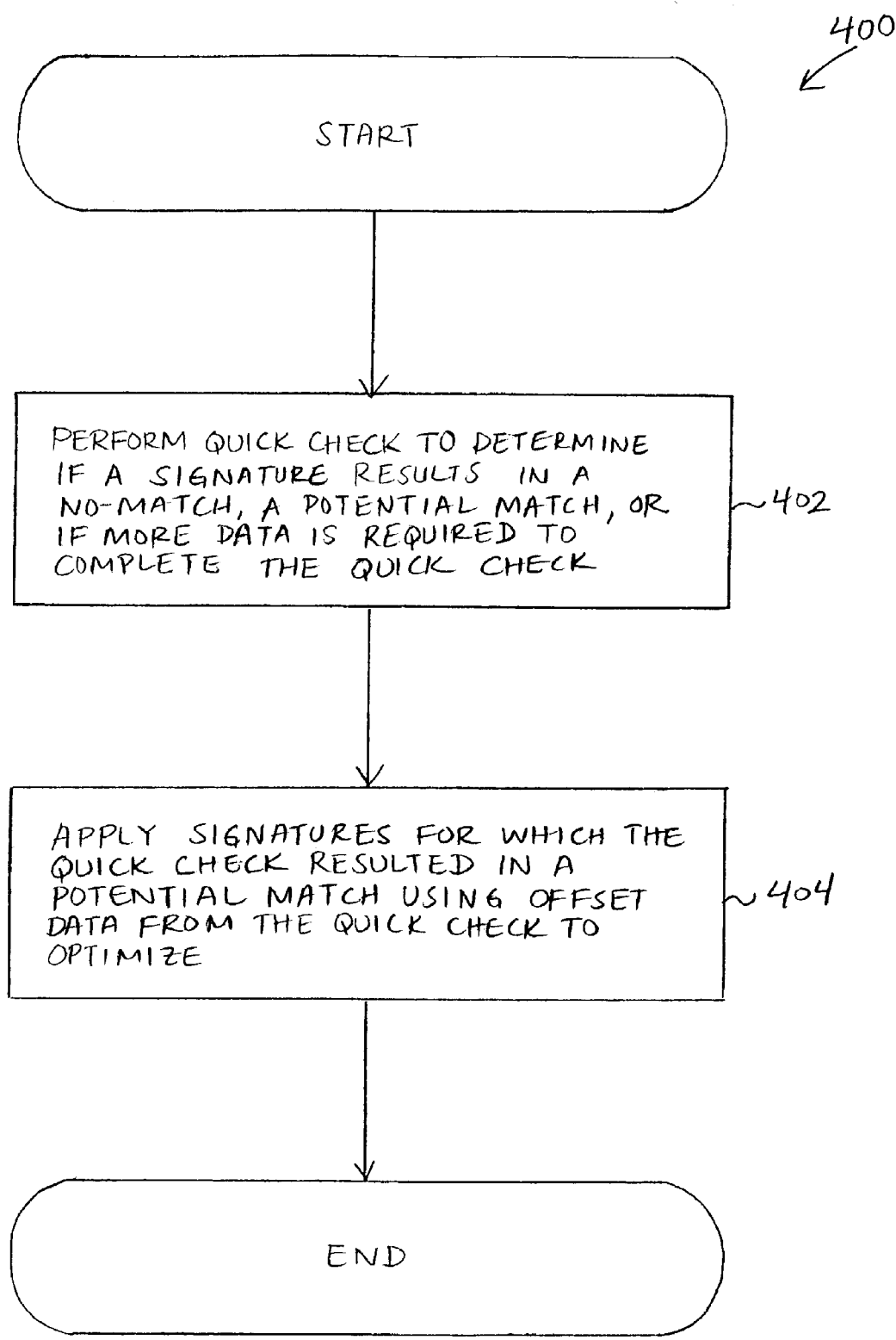
FIG. 4 illustrates an embodiment of a process used for signature based pattern matching that utilizes an initial quick check analysis to scan a given data stream.

FIG. 4 illustrates an embodiment of a process used for signature based pattern matching that utilizes an initial quick check analysis to scan a given data stream. In some embodiments, process 400 of FIG. 4 is used to implement 204 of FIG. 2. At 402 a quick check analysis is performed on a data stream. In some embodiments, the quick check analysis includes a quick check for each signature in the signature set. In alternative embodiments, the quick check analysis is performed only on a subset of signatures that have a prefix that matches the corresponding portion of the target data stream (i.e., that satisfies an initial prefix based filtering). Performing the quick check analysis at 402 allows the elimination of signatures for which a no-match can be determined quickly without full analysis. Target data that does not match a particular signature in the signature set is identified with the fewest possible byte comparisons since only the bytes at the boundaries of each component of each signature are matched during a quick check. By filtering out unnecessary matching iterations, the efficiency of the pattern matching process is increased.

In some embodiments, the quick check analysis of 402 can be applied efficiently by using the boundary and offset data gathered during preprocessing of the signature to determine whether enough data from the target data stream is available to complete a quick check for the signature. If enough data is not available, more data can be requested or processing delayed until more data is received. If more data is not available, e.g., because the end of the data stream is reached, a no-match for the signature for which the quick check is being performed can be determined without performing (or performing completely) even the quick check comparisons.

During the quick check analysis of 402, a signature results in a potential match if the boundary values of all of the components of the signature are found in the given data stream in locations that satisfy any location (e.g., offset) information generated during preprocessing of the signature. For example, a match may be found to a quick check for the signature "foobar" if a byte with value "r" is found five bytes after a byte with value "f".

In some embodiments, offsets in the data stream at which the boundary values of the components match are recorded for each signature for which the target data stream is found to be a potential match. For signatures that result in a potential match at 402, full signature matching is applied to the given data stream at 404 using the offset data of the data stream collected from the quick check analysis in order to the optimize the pattern matching process.

Figure 5:
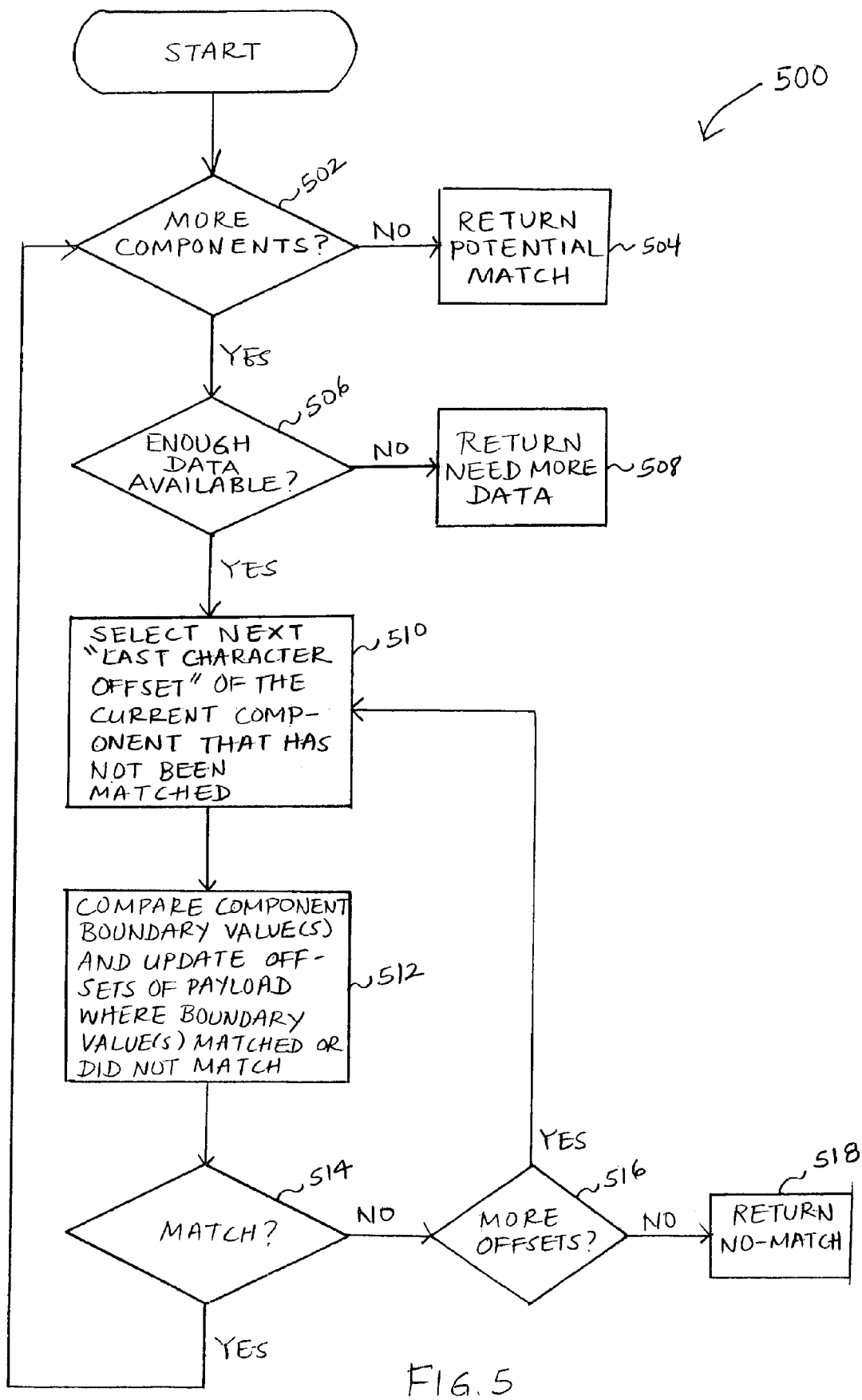
FIG. 5 illustrates an embodiment of a process used to perform a quick check of a signature against a given data stream.

FIG. 5 illustrates an embodiment of a process used to perform a quick check of a signature against a given data stream. In some embodiments, process 500 of FIG. 5 is used to implement 402 of FIG. 4. In some embodiments, process 500 is applied to each signature in the signature set at the IDS. In alternative embodiments, process 500 is applied to only each signature in a subset of signatures, e.g., a subset identified in prefix based pattern matching. In some embodiments, the quick check processing includes determining whether the boundary values of a component of a signature are satisfied by the target data stream wherein the boundary values and the offsets of the last character of the component are determined as described above in connection with 304 of FIG. 3. At 502 it is determined whether any more components in the signature require quick check processing with respect to the data stream currently being analyzed. At the first iteration of process 500 for a signature, 502 results in the affirmative (i.e. more component(s) exist) since at the first iteration no component(s) of the signature have been processed. If at a subsequent iteration of process 500 all of the component(s) that comprise the signature have been processed and the quick check criteria (e.g., boundary values and locations) are satisfied by the target data stream, such that no more components of the signature remain to be processed, then it is concluded at 504 that the target data stream is a potential match for the signature.

If it is determined at 502 that one or more components of the signature still require quick check processing with respect to the given target data stream, it is determined at 506 whether enough data is currently available in the target data stream to match the desired component in the signature. In some embodiments, the location (e.g., offset) information determined during preprocessing of the signature is used to determine whether enough of the target data stream is available to complete the quick check processing. For example, if a beginning boundary value is or may be matched and the associated ending boundary value of the component may occur at an offset of 18 bytes from the beginning boundary of the component, it is determined in 506 that enough data is available only if at least 18 bytes of the target data stream are available. If it is determined at 506 that enough data is not available, it is concluded at 508 that more data is needed. In some embodiments, if more data is needed, process 500 ends at 508 and is restarted at a later time, e.g., after a wait period, to allow time for more data to be received or obtained. In some alternative embodiments, process 500 returns to 506 after 508 and continues to 510 once sufficient data is available, unless it is determined that the end of the target data stream has been reached such that sufficient additional data will never become available, in which case the process returns a "no match" result for the signature.

If it is determined at 506 that enough data is available to continue with or begin processing, in 510, a next last character offset of the current component that has not already been tested is selected. In some embodiments, the last character offsets of a component are tested in ascending order, from the smallest to the largest in successive iterations of process 500. The smallest and largest last character offsets correspond to the component minimum and maximum lengths, respectively. By matching the last character offsets of a component starting with the smallest value, a possible premature conclusion that more data is necessary at 508 can be avoided. In some embodiments, in the first iteration of process 500 for a specific component, the last character offset is set to the minimum length of the component. In subsequent iterations of process 500 for this component, the last character offset is set to the sum of the current last character offset and a value that lies between fixed increments of the subcomponent minimum and maximum lengths. In some embodiments, the offsets of the last character occur at multiples of the range defined by the subcomponent minimum and maximum lengths.

After selecting a last character offset at 510, at 512, the boundary values of the current component are compared with the target data stream in the locations of the data stream at which the current component is expected if the current signature is part of the given data stream. The offset selected in 510 of the last character of the component from the first character of the component is utilized by the comparison operation of 512. In some embodiments, during the comparison operation of 512, offsets in the payload or data stream at which the boundary values of the given component match or do not match are recorded and/or updated.

In some embodiments, 512 comprises comparing the boundary values, i.e. the first character and the last character, of the component currently being processed with the values of the bytes in the target data stream that occur at the offset(s) at which one would expect to find them, based on the preprocessing of the signature, in a data stream that matches or potentially matches the signature. If more than one permutation exists for a given component, a number of iterations of process 500 may be required to search the target data stream at all the possible last character offsets of the component to determine if a match of the last character of the component is present. In some embodiments, a match for a boundary value may be found in more than one location within the target data stream. In 512, the first character of the component is compared to the byte in the target data stream at the current payload offset. The last character of the component is compared to the byte at the current payload at an offset from the current payload offset that is equivalent to the last character offset of the component for the current iteration of process 500 (e.g., as determined at 510). If more than one possible offset of the last character of a component exists, in some embodiments, during the first iteration of matching any given component, the offset of the last character is set to the minimum length of the component. During subsequent iterations of process 500 for the given component, offsets of the last character are checked in ascending order, so that the last offset that is checked for a particular component corresponds to the maximum length of the component. As previously discussed, in some embodiments possible values of the last character offsets may be calculated at multiples of the range defined by the subcomponent minimum and maximum lengths wherein the multiples correspond to the range defined by the component minimum and maximum lengths.

It is determined at 514 whether the comparison operation of 512 resulted in a match (i.e. if the boundary values of the current component were found in the target data stream at valid locations in the target data stream). In some embodiments, if it is determined at 514 that a match has been found, at 502 it is determined whether any more components exist in the signature that need to be matched. If no other components exist, a potential match result is returned at 504. If more components exist in the signature, process 500 is iterated for the next component in the signature. However, if at 514, it is determined that the boundary values of a component did not result in a match with bytes in the data stream at the proper locations, it is determined at 516 whether more offsets of the last character of the given component exist that need to be checked against the target data stream. If it is determined that one or more last character offsets of the given component exist at 516, the next last character offset is selected at 510 to be compared with the target data stream, and process 500 continues from 510. If all last character offsets of a component have already been matched against the target data stream and none matched, it is concluded in 518 that the current signature results in a no-match, thus ending process 500 for that signature.

In some embodiments, even if it is determined at 514 that a match has been found, the target data stream is further searched or tested to determine whether any other portion(s) of the data stream result in a match for the first or last byte, as applicable, of the component currently being processed. For example, the entire target data stream may be searched for all locations at which a match for the first character of a component is found, and the quick check of process 500 is repeated at all locations in the target data stream that result in a match. For example, if the component (or signature) being searched for is "foobar" and the target data stream includes an expression such as "foonanfooqarfoobar", all instances of the occurrence of the first character of the component must be checked for in the target data stream to determine whether the component is part of the target data stream. Thus, in the given example, the first character "f" of the component occurs in the target data stream "foonanfooqarfoobar" at three instances. Each instance of the occurrence of the first character in the target data stream is treated as a potential beginning of the given component, and process 500 is iterated for each such potential first character position found in the target data stream. In the given example, the segments in the data stream "fooqar" and "foobar" would be identified as potential matches to "foobar" during the quick check of process 500.

In some embodiments, even if it is determined at 514 that a match has been found, all possible last character offsets of a component are tested to determine whether any other valid last character offset(s) also result in matches. All last character offsets of the component that is being compared to the target data stream that result in matches are found in process 500 and returned as possible matching last character offsets of the component. For example, if the component "(foo.*bar)" is being searched for in a target data stream that includes the expression "foonarqobar", the positions or offsets of the two "r's" in the given data stream are returned as potential last character matches of the component. During further analysis of the data stream, "foonar" will result in a no match, while "foonarqobar" will result in a match.

Thus, all possible boundary value (i.e. first character and last character) locations may be searched for in a given input data stream to identify potential matches to a component (or signature). That is, all occurrences of the first character of the component being tested in the given input data stream are tested as possible beginnings of the component. Similarly, all possible last character offsets of the given component are compared with the input data stream, and those that result in matches are recorded so as to facilitate fully testing the component (or signature) against the given input data stream.

Figure 6:
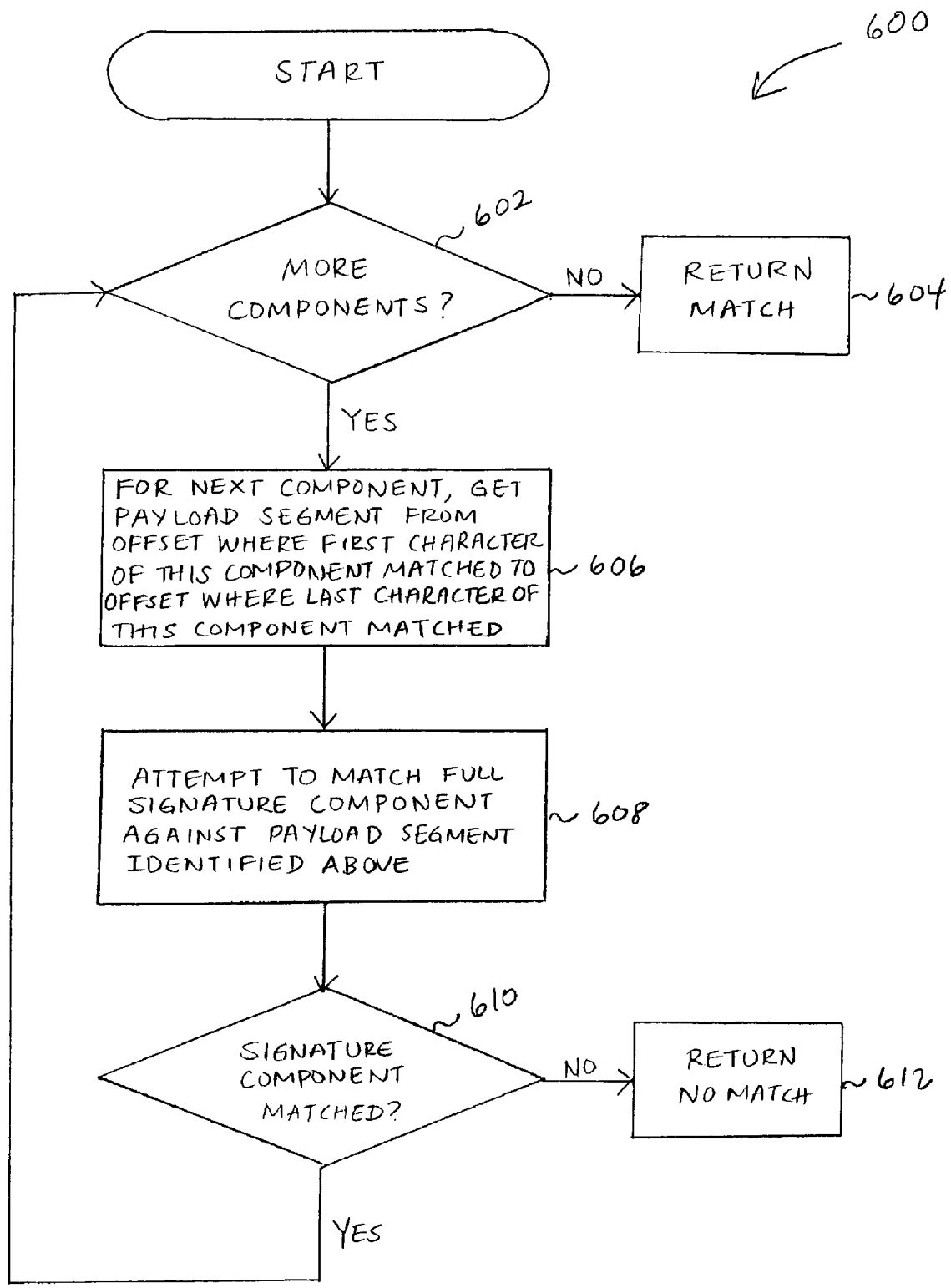
FIG. 6 illustrates an embodiment of a process used to apply a signature fully to a given data stream or a portion thereof.

FIG. 6 illustrates an embodiment of a process used to apply a signature fully to a given data stream or a portion thereof. In some embodiments, process 600 of FIG. 6 is used to implement 404 of FIG. 4. In some embodiments, process 600 is executed after finding at 504 in FIG. 5 that a signature is a potential match. At 602 it is determined whether any more components in the signature exist that need to be applied using process 600. If all of the component(s) of the signature have already been found to be present in the target data stream or a portion thereof and no more components of the signature remain to be processed, then it is concluded at 604 that the signature matches, i.e. the signature appears in the target data stream. If it is determined at 602 that a next component of the signature has yet to be applied to the target data stream, at 606, the payload or data stream segment beginning at the offset where the first character of this component was found in the quick check processing to be matched through the offset where the last character of this component was found in the quick check processing to be matched is identified. In some embodiments, the offsets in the payload where the first and last characters of a component matched are recorded in 512 of FIG. 5.

In 608, the full signature component is applied to the payload segment identified in 606. It is determined at 610 whether the entire signature component is satisfied by the portion of the data stream identified in 606. If it is determined at 610 that the signature is not satisfied, at 612 a no-match result is returned. If it is determined at 610 that the full signature component is satisfied, then it is determined at 602 whether any more component(s) exist in the signature that have not yet been fully applied. If it is determined at 602 that more components of the signature need to be applied fully, then process 600 is iterated again for the next component in the signature that needs to be applied. If it is determined at 602 that no more components exist that have not already been applied, then a match result for the signature is returned at 604. In some embodiments, the quick check may result in more than one potential match being found in the target data stream for one or more components, in which case the process 600 is performed for each potential match found and a "match" result returned if all components of the signature are found to be present based on any potential match.

The performance of signature based pattern matching can be significantly improved by breaking a signature into components and preliminarily matching the boundary values of each component of the signature with bytes at proper locations in the data stream. As a result of such a preliminary quick check, data that cannot possibly match a signature can be identified if only a single boundary value of a component of the signature fails to match with the input data stream. Computed values of the minimum and maximum lengths of each component can be used to determine whether enough data is available in the current input data stream prior to performing any matching iterations. During the quick check of component boundary values, offsets in the data stream that matched the first and last characters of each component are collected and recorded for signatures that result in a potential match. Such offset information allows the full signature to be more efficiently matched against the input data stream.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of determining whether a data stream matches a signature, comprising:

parsing, using a processor, the signature into one or more components;

identifying, using the processor, for at least one of said one or more components a plurality of boundary values, wherein identifying for at least one of said one or more components the plurality of boundary values includes determining for each boundary value one or more boundary value locations at which the boundary value would be expected to occur in a target data stream if the target data stream matched the signature, wherein for each component the plurality of boundary values include a first value and a last value of the component and further comprising determining for each component one or more offsets of the last value of the component from the first value of the component, wherein each component (1) has a component minimum length and a component maximum length that define a first range of component length values and (2) includes a subcomponent having a subcomponent minimum length and a subcomponent maximum length that define a second range of subcomponent length values; and concluding, without fully applying the signature to the data stream, that the data stream does not match the signature if for any component an associated boundary value does not match at least one corresponding value in the data stream at the determined boundary value location of the data stream;

concluding that the signature is a potential match if all the boundary values of all the components of the signature match at least one corresponding value in the data stream; and applying the signature to the data stream in the event it is concluded that the signature is a potential match;

wherein at least one boundary value associated with the signature does not occur in a prefix portion of the signature.

2. The method as recited in claim 1, wherein concluding without fully applying the signature to the data stream that the data stream does not match the signature if for any component an associated boundary value does not match at least one corresponding value in the data stream includes comparing each boundary value only to respective data stream values that occur at the one or more boundary value locations associated with the boundary value.

3. The method as recited in claim 1, wherein the boundary values include an initial boundary value associated with an initial portion of the signature and the boundary value locations for boundary values other than the initial boundary value include one or more offset values each indicating a position relative to the initial boundary value.

4. The method as recited in claim 1, further comprising checking the data stream for multiple matches of one or more of the boundary values.

5. The method as recited in claim 1, wherein fully applying the signature includes comparing each value of the signature to each corresponding value in the data stream.

6. The method as recited in claim 1, further comprising:
recording one or more locations in the data stream at which the boundary values of the components matched corresponding values in the data stream; and
fully applying the signature to the data stream utilizing the recorded one or more locations in the data stream at which the boundary values of the components matched.

7. The method as recited in claim 6, wherein utilizing the recorded one or more locations in the data stream at which the boundary values of the components matched includes for each pair of boundary values comparing signature values, if any, that occur between the pair of boundary values with the corresponding values in the data stream that occur between the recorded locations at which values matching the pair of boundary values were found.

8. The method as recited in claim 1, further comprising comparing each boundary value to one or more corresponding values in the data stream.

9. The method as recited in claim 8, further comprising determining, prior to comparing the boundary values associated with a component to one or more corresponding values in the data stream, whether enough data is available in the data stream to compare each boundary value associated with the component to one or more corresponding values in the data stream.

10. The method as recited in claim 9, further comprising waiting for enough data to become available if it is determined that enough data is not yet available in the data stream to compare each boundary value associated with the component to one or more corresponding values in the data stream.

11. The method as recited in claim 10, further comprising concluding that the data stream does not match the signature if it is determined that enough data is not and will not become available in the data stream to compare each boundary value associated with a component to one or more corresponding values in the data stream.

12. The method as recited in claim 1, wherein the signature comprises one of a plurality of signatures.

13. The method as recited in claim 12, further comprising:
parsing each signature into one or more components; and
identifying for each component of each signature one or more boundary values.

14. The method as recited in claim 1, wherein the signature is associated with malicious data known to have been used or known to be capable of being used to attack a computer.

15. The method as recited in claim 1, wherein the signature is associated with a policy.

16. The method as recited in claim 1, wherein the signature comprises a regular expression.

17. The method as recited in claim 1, wherein the first value of the component is a first byte of the component and the last value of the component is a last byte of the component.

18. The method as recited in claim 1, wherein:
for each component the offsets of the last value of the component occur at a set of locations each of which is determined by multiplying a value from the second range of subcomponent length values for that component by a value from the first range of component length values for that component.

19. The method as recited in claim 1, wherein:
for each component the offsets of the last value of the component occur at a set of locations each of which is determined by multiplying one of the possible subcomponent length values for that component by one of the component length values in the range of component length values for that component.

20. The method as recited in claim 1, wherein the prefix portion comprises a contiguous series of one or more values beginning with a first value associated with the signature.

21. The method as recited in claim 1
wherein said parsing and identifying comprise pre-processing performed prior to the data stream becoming available for analysis.

22. The method as recited in claim 1, wherein the processor is associated with a detection system.

23. The method as recited in claim 22, wherein the detection system comprises an intrusion detection system.

24. A system configured for determining whether a data stream matches a signature, comprising:
a communication interface configured to receive the data stream; and
a processor configured to:
parse the signature into one or more components;
identify for at least one of said one or more components a plurality of boundary values, wherein identifying for at least one of said one or more components the plurality of boundary values includes determining for each boundary value one or more boundary value locations at which the boundary value would be expected to occur in a target data stream if the target data stream matched the signature, wherein for each component the plurality of boundary values include a first value and a last value of the component and further comprising determining for each component one or more offsets of the last value of the component from the first value of the component, wherein each component (1) has a component minimum length and a component maximum length that define a first range of component length values and (2) includes a subcomponent having subcomponent minimum length and a subcomponent maximum length that define a second range of subcomponent length values; and
conclude, without fully applying the signature to the data stream, that the data stream does not match the signature if for any component an associated boundary value does not match at least one corresponding value in the data stream at the determined boundary value location of the data stream;
conclude that the signature is a potential match if all the boundary values of all the components of the signature match at least one corresponding-value in the data stream; and
apply the signature to the data stream in the event it is concluded that the signature is a potential match;

wherein at least one boundary value associated with the signature does not occur in a prefix portion of the signature.

25. A computer readable storage medium for determining whether a data stream matches a signature, the computer readable storage medium comprising stored computer instructions for:

parsing the signature into one or more components;

identifying for at least one of said one or more components a plurality of boundary values, wherein identifying for at least one of said one or more components the plurality of boundary values includes determining for each boundary value one or more boundary value locations at which the boundary value would be expected to occur in a target data stream if the target data stream matched the signature, wherein for each component the plurality of boundary values include a first value and a last value of the component and further comprising determining for each component one or more offsets of the last value of the component from the first value of the component, wherein each component (1) has a component minimum length and a component maximum length that define a first range of component length values and (2) includes a subcomponent having a subcomponent minimum length and a subcomponent maximum length that define a second range of subcomponent length values; and concluding, without fully applying the signature to the data stream, that the data stream does not match the signature if for any component an associated boundary value does not match at least one corresponding value in the data stream at the determined boundary value location of the data stream;

concluding that the signature is a potential match if all the boundary values of all the components of the signature match at least one corresponding-value in the data stream; and applying the signature to the data stream in the event it is concluded that the signature is a potential match;

wherein at least one boundary value associated with the signature does not occur in a prefix portion of the signature.

\* \* \* \* \*